3,072,229
STRUCTURAL ELEMENT TO FORM A FRAME
FOR WINDOWS AND THE LIKE
Heinz Pasche, Hamburg, and Ludwig Hermann, Hamburg-Wandsbek, Germany; said Hermann assignor to said Pasche, Hamburg-Wandsbek, Germany
Filed Aug. 6, 1958, Ser. No. 753,485
3 Claims. (Cl. 189—65)

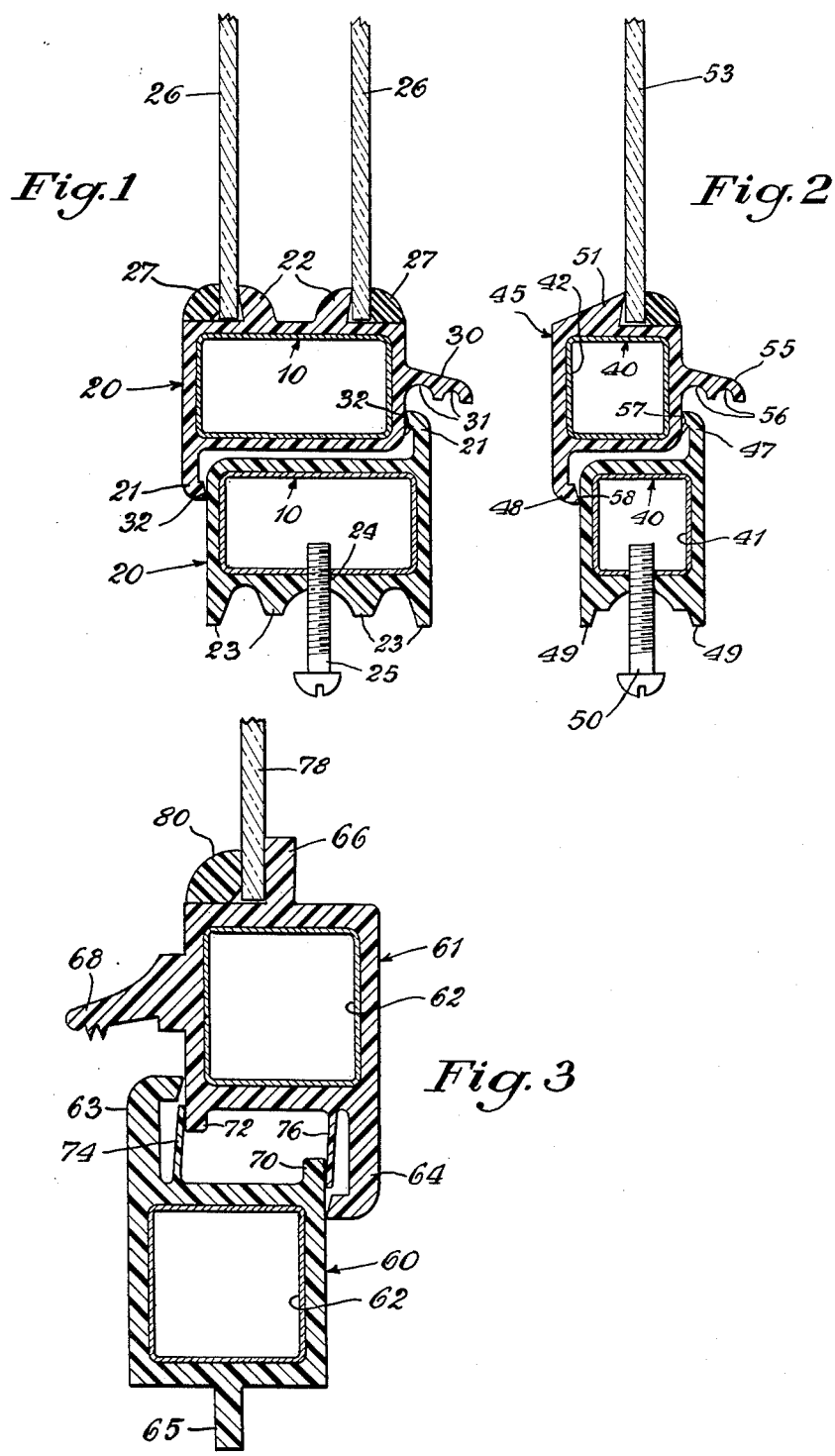

The present invention relates to improvements in the production of extruded structures of hollow section from thermoplastic synthetic material and is a continuation in part of U.S. patent application 479,583, filed January 3, 1955, which has now become abandoned.

The primary object of the present invention resides in the production of various framing structures for window and other openings formed from a metallic structural unit of hollow section having an extruded covering bonded thereto and provided with variously arranged ribs and flanges to provide abutments for window panels, sealing elements and various other projections.

Another object is to provide a frame structure for windows and the like which is formed from a hollow structural element having a synthetic resin plastic sheathing provided with longitudinally extending ribs and grooves for receiving glass panel elements in which the structural elements may be cut to any desired length in forming a window or door frame structure of the required size and dimensions.

Another object resides in the provision of a structural framing element in which a hollow metal element is covered by a sheathing of extruded synthetic resin plastic material which can be maintained in stock in forming window and other frames thus eliminating the necessity of using a plurality of different elements of various sectional shapes. Thus, the manufacturer of windows and the like need only stock a framing structure of one type from which window and door frames may be constructed of various dimensions.

Another object is to provide a framing structure element in which the hollow metallic body member forms a support for the deformable hollow synthetic plastic material after the same is extruded thereon.

Another object resides in the provision of a framing element as above set forth which can be supplied to the manufacturer of window and door frames in great lengths which can be cut to the desired dimensions according to the particular use to which the structure is intended.

It has been found in practice that thermoplastic synthetic material can be extruded over a hollow metallic support when cooled down to the thermoelastic range, and that the propensity of the material prevents the same from becoming displaced from the metallic base since a number of synthetic resin materials have a natural tendency to adhere to metal when cooled down to the above range.

Further, it has been found in practice that polyethylene and polyvinylchloride have a natural tendency to adhere to metal and are particularly suitable for use in the production of hollow sectional shapes. Apart from the fact that the synthetic material in extruded form is stiffened against twisting or warping to a considerable extent the structure is stabilized such that the synthetic plastic extruded covering can be provided with longitudinally extending ribs and the like of a flexible nature and are particularly suitable for sealing purposes and the like. The cross section of the metallic support structure will correspond to the particular sectional shape of the extruded synthetic material. In the present invention cut pieces in scrap form may be recovered and the plastic material heated and stripped from the supports and reused by any suitable bonding process by being welded or bonded together or otherwise fastened. The invention is particularly suitable for use in constructing railings for enclosing land, for frames, for pictures or paintings as well as for window and door frames.

Other objects and advantages of the invention will become apparent during the course of the following description of the accompanying drawings wherein:

FIGURE 1 is a vertical cross sectional view showing a double window construction.

FIGURE 2 is a vertical cross sectional view showing a modified form of the invention in which the sectional shape of the framing element is intended for supporting a single glass panel.

FIGURE 3 is a vertical cross sectional view of another modified form of the invention showing the sectional shape as being provided with mutually engaging sealing flaps and opposed ribs to provide abutments for a window frame structure and transparent panel.

Figure 4:
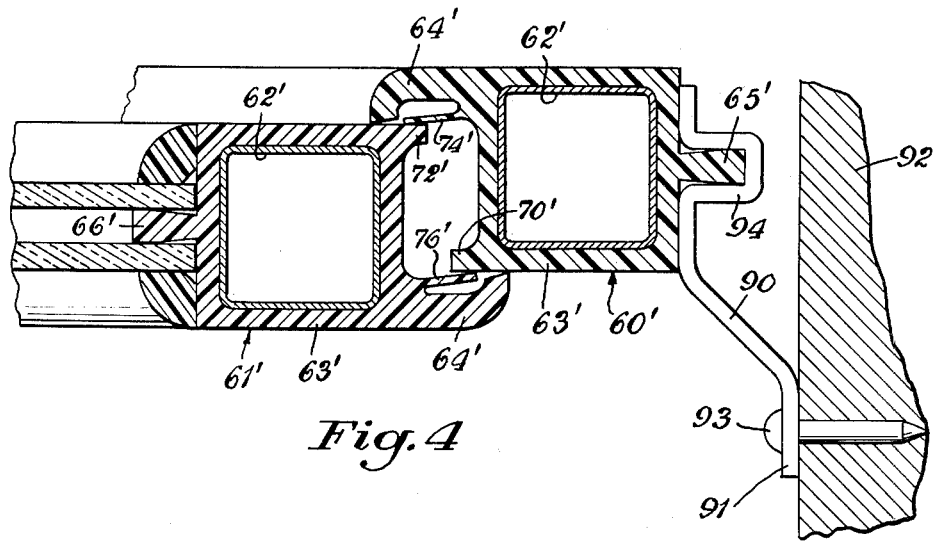
Figure 5:
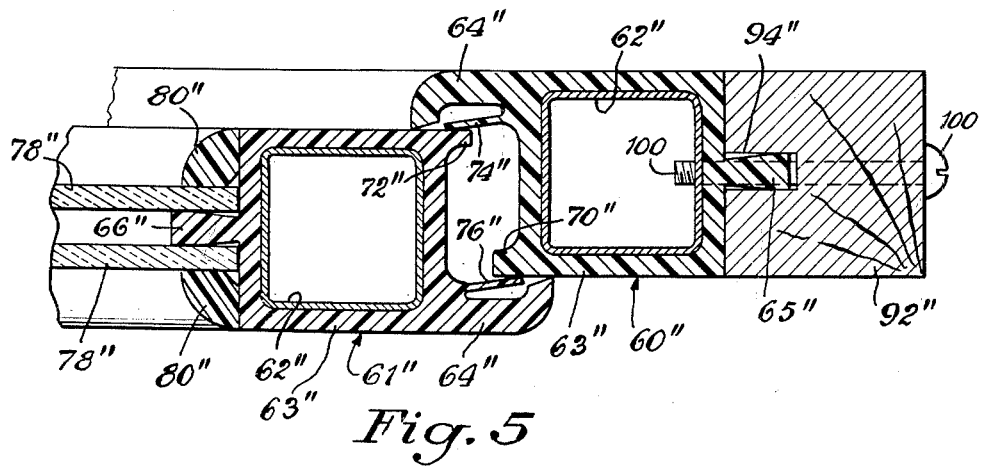

FIGURE 4 is a horizontal cross sectional view through a fragmentary portion of a window structure in which the frame is constructed of the plastic covered structural element as well as the window sash such that mutually engaging sealing flaps thereon will effectively seal the window against the entrance of moisture and the like, and FIGURE 5 is a horizontal cross sectional view through a fragmentary portion of a window structure illustrating a slightly modified form of the invention and showing the manner in which the opposed ribs are employed for being received in a support or window opening.

In the drawings, and more in detail, attention is directed to FIGURE 1 wherein the reference numeral 10 will generally be employed to designate a metallic structural element of hollow rectangular shape. Extruded on the hollow metallic supporting element 10 is a covering of thermoplastic material for example polyvinylchloride generally designated 20. In the present invention extrusion apparatus is used similar to that shown in U.S. Patent 2,447,420, issued August 17, 1948 to Samuel D. Moore. The extrusion die is formed to provide a laterally extending flange 21 and a pair of longitudinally extending ribs 22 on one of the extruded shapes, while longitudinal ribs 23 are formed on the other extruded shape. In FIGURE 1, the lowermost extruded shape generally designated 20 is intended to be used as a framing structure for a window and may be provided with an opening 24 for receiving a threaded fastener 25 having a head for receiving a screw driver for the purpose of anchoring the extruded shape to a wooden framing structure for a door or window. The longitudinal ribs 23 are adapted to engage the wood framing structure (not shown) and secure the same in position in sealing contact with said wood framing structure.

The uppermost extruded structure 20 forms a sash structure and the longitudinal ribs 22 provide abutments for transparent glass panels 26 the edges of which are held in place by plastic sealing strips 27. Also, the uppermost extruded structural shape 20 is provided with a longitudinally extending laterally projecting rib 30 having grooves 31 on its underside to shed water and said rib 30 overlies the longitudinally extending laterally projecting rib 21 on the framing element. The disclosure in FIGURE 1 is intended to illustrate the frame and sash of a swinging window structure, and it will be noted that the longitudinally extending ribs 21 are shaped to provide sealing contact surfaces 32 adapted to engage the vertical opposite walls of the framing and sash members.

In the modified form of the invention shown in FIGURE 2 the reference character 40 will generally be employed to designate a hollow structural element formed of metal and of square section. The lowermost member 40 as at 41 is intended to provide a framing structure support for the uppermost sash structure support 42. As before, the hollow metallic structural elements 40 are covered with an extruded synthetic plastic composition to provide a sheathing structure 45 which is for example, a polyvinylchloride based extrusion molding composition. The plastic sheathing is of a rubbery nature similar to that described in connection with the form of the invention shown in FIGURE 1 and the extruded plastic sheathing 45 for the lowermost metallic element 41 is provided with a longitudinally extending rib 47, while the uppermost sheathing for the structural element 42 is provided with a longitudinally extending rib 48 arranged in opposed relation to the rib 47. The supporting framing structure includes longitudinal ribs 49 projecting from the edges thereof and are adapted to contactually engage a window framing structure and be drawn into sealing engagement therewith by means of a fastening element 50. The sheathing for the uppermost structural element 42 is provided with a longitudinal rib 51 adapted to form an abutment for a glass panel 53, and the edge of the panel is held in place by means of a suitable sealing strip 54. In addition, the extruded shape of the upper metallic structural element 42 is such as to provide a longitudinally extending rib 55 having watershed grooves 56 on its underside and said rib 55 is arranged to overhang the rib 47. The structure illustrated in FIGURE 2 is also intended to be used in connection with vertically or horizontally swinging windows and the edges of the ribs 47 and 48 are provided with contact surfaces 57 and 58 respectively arranged to engage the vertical walls of the frame and sash structure when the window is in a closed position.

In the form of the invention shown in FIGURE 3 the reference numeral 60 will generally be employed to designate a framing element, while the reference character 61 will generally designate a sash element or structure of a swinging type window assembly. The framing and sash elements 60 and 61 are formed from a hollow tubular metallic element 62 of substantially square section. As described in connection with FIGURES 1 and 2 the tubular structural elements 62 are covered with a thermoplastic material such as a polyvinylchloride based extrusion molding composition, and in the form of the invention shown in FIGURE 3 the sheathing for the framing structure 60 is of a rubbery consistency and is provided with a longitudinally extending rib 63 adapted to engage one of the side walls of the sash element 61, similarly, the sash 61 is provided with a rib 64 arranged to engage the opposite side wall from the rib 63 of the lower framing element 60. The thermoplastic material is extruded to provide longitudinal ribs 65 and 66 on the framing and sash elements 60 and 61 respectively. A longitudinally extending watershed rib 68 is formed on the lower rail of the sash structure 61 and overhangs the rib 63 as before. In addition, ribs 70 and 72 are formed on the framing and sash elements 60 and 61 and project a slight distance beyond the top wall of the element 60 and the lower wall of the element 61.

Formed on the top wall of the frame element 60 and spaced inwardly from the rib 63 is a relatively thin, flexible, longitudinally extending rib 74 which has its free end arranged to engage the rib 72 to form a contact seal. Similarly, a thin, flexible, longitudinal rib 76 is formed on the extruded sash structure 61 and is adapted to contactually and sealingly engage the rib 70 of the lower framing element 60. Thus, when the sash structure 61 is in its closed position a double seal is provided to exclude air and moisture and prevent the same from passing through the joint between the elements 60 and 61. The longitudinally extending rib 65 may be employed to anchor the framing element 60 in place in a window opening, while the longitudinal rib 66 is employed as an abutment for a glass panel 78 which is held in place by a sealing compound of a plastic nature as at 80.

In the form of the invention shown in FIGURE 4 there is provided a framing element generally designated 60' and a sash element generally designated 61'. The framing and sash elements are formed from tubular metal structural elements 62' of square section and are provided with extruded sheathings 63' as described in connection with the form of the invention shown in FIGURE 3. It is pointed out, that in the form of the invention shown in FIGURE 4 the extruded shapes of the elements 60' and 61' are identical, and each includes a rib 65' and 66' as before. Also, each extruded shape 63' is provided with a longitudinally extending rib 64' which contactually engage opposed side walls of the elements 60' and 61'. The extruded element 60' is provided with an integral rib 74' which is adapted to engage a rib 72' on the sash element 61', and similarly, the sash element 61' is provided with a thin flexible integral rib 76' which is adapted to engage a rib 70' extending longitudinally along one edge of the framing structure 60'. In the structure shown in FIGURE 4 the centrally located longitudinal rib 65' is received in a bracket 90 having an end portion 91 which is attached to a wooden framing element 92 by a nail or other fastening element 93. The bracket 90 is bent as at 94 to receive the rib 65' and it is intended to support the framing element 60' in a window opening or the like by using a plurality of brackets 90 arranged in spaced apart relation around the perimeter of the framing structure.

In the modified form of the invention shown in FIGURE 5 the framing element 60'' is substantially the same as before and cooperates with a swinging sash structure generally designated 61''. The tubular metal structural element 62'' is of square cross section for both elements and a covering of synthetic thermoplastic material 63'' is extruded on the tubular metal structural elements 62'' to provide longitudinal ribs 64'' and longitudinal ribs 65'' and 66''. Formed integral with the sheathing adjacent the longitudinal ribs 64'' are flexible longitudinally extending sealing ribs 74'' and 76'' which are arranged to contactually engage longitudinal ribs 72'' and 70'' on opposed framing elements.

The longitudinal ribs 66'' and 65'' are identical and the rib 66'' forms an abutment for glass panel elements 78'' which are held in place by plastic sealing strips 80''. The ribs 65'' on the framing elements are adapted to support the side, top and bottom rails of the framing structure of a window or the like, and as shown in FIGURE 5 the rib 65'' is received in a groove 94'' in a wooden framing support element 92'' arranged around the periphery of the window opening. A headed threaded fastener 100 may be passed through an opening in the wood support 92'' and may be received in a correspondingly threaded opening formed in the tubular structural element 62''.

Various thermoplastic compositions may be used, as for instance, a polyethylene thermoplastic composition as shown in U.S. Patent 2,798,015 issued July 2, 1957. If desired, the plastic sheathing may be formed of extruded hydrogenated rubbery butadiene polymer as shown and described in U.S. Patents 2,348,658 and 2,736,403. Also, halogen containing polymer material may be used as shown in U.S. Patent 2,752,332 which is particularly useful as a coating for metal and has the propensity to adhere thereto.

In the production of window, door and similar frame structures the continuous length of plastic coated tubular metal is cut to the desired length on a miter cutter set to cut a 45° angle. When the ends of the cut structural units are placed together to form the corners of a door or window frame structure, an angle bar of 90° (not shown) is inserted in the tubular metal supporting elements 10, 40, 62 and 62' and 62''. Suitable means are provided for holding the metal corner inserts in place such as welding or the like.

Thus, it will be seen that there is provided a plastic covered structural element having ribs for supporting a glass panel as well as supporting one of the elements and in addition there is provided flexible sealing ribs which are directed at an angle to the longitudinal ribs 63 and 64 in FIGURES 3 and 72'–72" and 70' and 70" in FIGURES 4 and 5 respectively. It is intended that the relatively thin flexible ribs 74, 76, 74', 76', 74" and 76" extend at an acute angle to the adjacent face with which it is moved into contact so that when the sash is fully closed said thin, flexible ribs will be flexed and will be yeldingly held in sealing engagement with one of the wall surfaces of an adjacent framing element or sash structure.

It is to be understood that in all forms of the invention the plastic sheathing will be constructed with longitudinally extending ribs produced by an extrusion die of the same configuration and that all of the framing elements or rails, as well as the sash rails may be constructed of identical shape with the exception of the lower rail which is provided with a watershed rib to prevent water and moisture from running downwardly and falling by gravity between the sealing joints of the framing and sash members.

By framing and sash structures is meant structural units employed around the marginal edges of a window opening or the like, and a frame element for a window panel respectively.

Further, it is intended to completely enclose the structural metal tubular supporting elements within a sheathing of plastic material as set forth above by extruding the plastic material on the tubular metal support while the support is passed through the die opening of an extrusion apparatus. Thus, the use of adhesives and the like to cause the plastic to adhere to the metal base is eliminated since the plastic material has a natural tendency to adhere to the metal after it has completely cooled if a plastic material selected from the art which has a propensity to adhere to metal is used.

What we claim is:

1. In a window structure including a frame and a movable sash, structural elements of tubular metal for said frame and sash, a sheathing extruded on said tubular structural element of thermoplastic material, the extrusion for said framing structural element and sash element providing centrally arranged ribs on one face thereof and the adjacent portions of said frame and sash elements being extruded to provide mutually engaging sealing ribs, the sealing rib on each element being formed contiguous with one of the walls of the structural element to extend in an offset plane with respect to the centrally arranged rib and being of relatively thin material and adapted to flex upon engagement with a cooperating rib.

2. In a window structure including a window frame adapted to be mounted in the opening of a building and a swinging sash supported by said frame movable in a plane away from the plane of said window frame, said frame and sash being formed of substantially identical sectional shapes and including tubular metallic members of rectangular section covered with a sheathing of extruded thermoplastic material with the plastic material shaped to form anchoring and abutment ribs extending longitudinally of the frame and sash members and cooperating sealing ribs on the opposite walls of said framing and sash members, the sealing rib of the sash member being adapted to contactually engage one of the side walls of the framing member and the opposed sealing rib on the framing member being adapted to sealingly engage a side wall of the window sash, additional flexible sealing ribs of relatively thin section integrated with the opposed walls of the sash and framing members and located within the confines of the sealing ribs, said additional sealing ribs being arranged to engage inwardly and outwardly extending projections on the sash and frame members when the sash is in its closed position with the additional sealing ribs located to engage opposed faces of said longitudinal projections to permit the sash to swing free without the longitudinal projections obstructing movement when the sash is moved on its swinging plane, said abutments on the frame and sash members being arranged to form a seal around the opening of said window and a transparent panel respectively, and means for securing said sash and frame in said window opening.

3. In a window structure including prefabricated sash and frame members adapted to be mounted in the opening of a building having a framing structure with the sash member supported by the frame member to swing toward and away from said frame member, said frame and sash being formed of substantially identical sectional shape and including tubular metallic members of rectangular section, an extruded thermoplastic sheathing enclosing said metallic members and shaped to form longitudinally extending anchoring and abutment ribs on the frame and sash members and cooperating sealing ribs on the opposite walls of said members, the sealing rib of the sash member being adapted to contactually engage one of the side walls of the frame member and the opposed sealing rib on the frame member being adapted to sealingly engage a side wall of the sash member, the abutment ribs on the frame member being adapted to sealingly contact the framing structure of the window opening and the abutments on the sash member being adapted to receive a transparent window panel, additional sealing ribs located within the confines of the first named sealing ribs formed on opposed walls of the sash and frame members and arranged to engage spaced portions of the sash and frame members, said additional sealing ribs being of relatively thin section and normally flexed in a direction away from the first named sealing ribs of the respective sash and frame members so that when the sash member is moved to a closed position the additional sealing ribs will be moved toward the first named sealing ribs and placed under tension.

References Cited in the file of this patent

UNITED STATES PATENTS

| | | |
|---|---|---|
| 2,739,359 | Peterson | Mar. 27, 1956 |
| 2,753,603 | Strawther | July 10, 1956 |
| 2,808,914 | Renno | Oct. 8, 1957 |
| 3,012,642 | Emmerich | Dec. 12, 1961 |

FOREIGN PATENTS

| | | |
|---|---|---|
| 498,782 | Germany | May 30, 1930 |
| 779,278 | Great Britain | July 17, 1957 |